United States Patent [19]
Fujikawa et al.

[11] 3,950,726
[45] Apr. 13, 1976

[54] LOW TIRE PRESSURE ALARM SYSTEM FOR PNEUMATIC TIRES

[75] Inventors: Akira Fujikawa, Kodaira; Takashi Takusagawa, Ome; Akira Matsuda, Higashimurayama; Norio Goshima, Kodaira, all of Japan

[73] Assignee: Bridgestone Tire Company Limited, Tokyo, Japan

[22] Filed: Sept. 20, 1974

[21] Appl. No.: 507,987

[30] Foreign Application Priority Data
Oct. 1, 1973  Japan..........................48-114478
Oct. 12, 1973  Japan.........................48-118427

[52] U.S. Cl.............................. 340/58; 200/61.25
[51] Int. Cl.².................................. B60C 23/02
[58] Field of Search...... 340/58, 224; 325/111, 117; 200/61.22, 61.25

[56] References Cited
UNITED STATES PATENTS

| | | | |
|---|---|---|---|
| 3,016,515 | 1/1962 | Summers et al. | 340/58 |
| 3,223,969 | 12/1965 | Course | 340/58 |
| 3,329,934 | 7/1967 | Wooden | 340/58 |
| 3,697,944 | 10/1972 | Murano | 340/58 |

Primary Examiner—Alvin H. Waring
Attorney, Agent, or Firm—Haseltine, Lake & Waters

[57] ABSTRACT

A low tire pressure alarm system for pneumatic tires, wherein a radio transmitter which is adapted to produce an alarm signal of a predetermined frequency upon detection of an abnormal pressure drop is accommodated in a hollow casing for mounting on a wheel cap casing of a vehicle wheel. The alarm signal is transmitted through the hollow casing per se or through a metal coating on the hollow casing where the latter is formed from a non-conductive material. The transmitted signal is received by a receiving set which includes a receiving antenna located on the underside of the vehicle body for shielding the same from spurious or extraneous signals and a radio receiving unit mounted within a luggage compartment of signals. Upon reception of the alarm signal, the radio receiver actuates an alarming device which produces a flashing light or sound to indicate the pressure drop to an operator of the vehicle.

15 Claims, 7 Drawing Figures

LOW TIRE PRESSURE ALARM SYSTEM FOR PNEUMATIC TIRES

This invention relates to a low tire pressure alarm system, and more particularly to a low tire pressure alarm system having at least a radio transmitter housed in a cup-like hollow casing for mounting on a wheel cap casing of a vehicle wheel having a pneumatic tire for detection of an abnormal tire pressure drop.

With vehicles supported on pneumatic tires, it is very important to maintain proper pressure in the tires as improper tire pressure will invite accelerated wear of tires, many types of steering difficulty and dangerous driving conditions. There have heretofore been proposed various alarm devices in order to provide a solution to this problem. For example, it is well known in the art to mount on or about a valve stem of a pneumatic tire an assembly of a low tire pressure detector and a radio transmitting device including a transmitting antenna. The radio transmitter is adapted to produce and transmit a radio frequency alarm signal upon detection of a pressure drop below a predetermined level by the low tire pressure detector, to a receiving antenna of a receiving set which is usually mounted in the cab of a vehicle to actuate a warning means of the receiver set to give the driver a warning signal which is usually in the form of light or sound.

One of the difficulties encountered with such prior art low tire pressure alarm systems is that, since low tire pressure detector and radio signal transmitter assembly is mounted on or around the valve stem of the tire, the valve stem is required to bear the weight of the detector and transmitter assembly and subjected to an increased centrifugal force as well as greater mechanical shocks and vibrations during travel of the vehicle, resulting in breakage of the tire valve stem or of the connection between the valve stem and the detector and transmitter assembly. Another difficulty of the prior art system, though it is closely related to the first one, is that, when the transmitter is located inwardly of the wheel cap casing, the radiated signal waves are interfered with or obstructed by the wheel cap casing which is usually of metallic material, necessitating employment of a transmitter of a larger size for intenser radiation of the signal waves. However, employment of a larger transmitter means increased weight and centrifugal force on the tire valve.

It is therefore an object of the instant invention to provide an improved low tire pressure alarm system which will overcome the difficulties of the prior art as mentioned hereinabove.

It is another object of the invention to provide a low tire pressure alarm system having at least a radio transmitter housed in a cup-like hollow casing of a conductive or non-conductive material in a manner suitable for mounting on a wheel cap casing of a vehicle wheel having a pneumatic tire.

It is another object of the invention to provide a low tire pressure alarm system having a radio transmitter and its power source housed in a cup-like hollow casing of a conductive or non-conductive material for mounting on a wheel cap of a vehicle wheel having a pneumatic tire.

It is a still further object of the invention to provide a low tire pressure alarm system of the nature mentioned above, which is free from malfunctioning due to spurious or extraneous signals coming from outside during travel of the vehicle.

It is a further object of the invention to provide a low tire pressure alarm system which is simple and compact in construction, reliable in operation, and low in production cost.

According to the present invention, there is provided a low tire pressure alarm system for a pneumatic tire on a vehicle wheel including a wheel disc, a rim securely mounted on the wheel disc and having flanges for holding the tire, and a wheel cap casing covering an outer side of the wheel, the alarm system comprising in combination, a low tire pressure detector in pneumatic communication with the interior of the tire for detection of a tire pressure drop below a predetermined level, a hollow casing of a non-conductive material securely mounted on and substantially at the center of the wheel cap casing of the vehicle wheel, a radio transmitter accommodated in the hollow casing and connected to the low tire pressure detector for producing an alarm signal of a predetermined frequency upon detection of an abnormal tire pressure drop by the detector, and a receiving set including a receiving antenna for reception of an alarm signal transmitted from the radio transmitter and a radio receiver unit connected to the receiving antenna for actuating alarm means in response to the alarm signal.

The low tire pressure detector may be of a conventional type and preferably is directly connected to a valve stem of the tire. However, if desired, the detector may be mounted separately from the tire valve and communicated with the interior of the tire by way of a tubing which is connected at the opposite end to a port formed at a suitable position of the wheel rim.

The alarm signal produced by the radio transmitter may be transferred through a usual wire coil antenna or through the hollow casing per se where it is formed from a suitable material for this purpose. Alternatively, there may be provided a metal coating on the outer or inner wall surface of the hollow casing of a non-conductive material to serve as a transmitting antenna. Preferably, the transmitting antenna is located outwardly of the rim flange to preclude its interference or obstruction.

In the present invention, in order to avoid malfunctioning of the alarm system due to spurious or extraneous signals which may come from outside during travel of the vehicle, a receiving antenna is located on the underside of the vehicle body for maintaining the unit in a state completely shielded from the spurious or extraneous signals while the radio receiving unit is mounted within a luggage compartment of the vehicle.

In one particular form of the invention, the hollow casing is formed in a truncated cone shape closed at the converging end and has its diverging end securely fitted into an annular groove which is formed in the center portion of a wheel cap casing concentrically with a center aperture thereof. The radio transmitter is fixedly mounted on an insulating plate which covers the center aperture of the wheel cap casing from outside and which is tightly clamped to the hollow casing together with a backing plate covering the center aperture on the inner side of the wheel cap casing.

The above and other objects, features and advantages of the invention will become clear from the following description and the appended claims, taken in conjunction with the accompanying drawings which show by way of example preferred embodiments of the invention and wherein:

Figure 1:
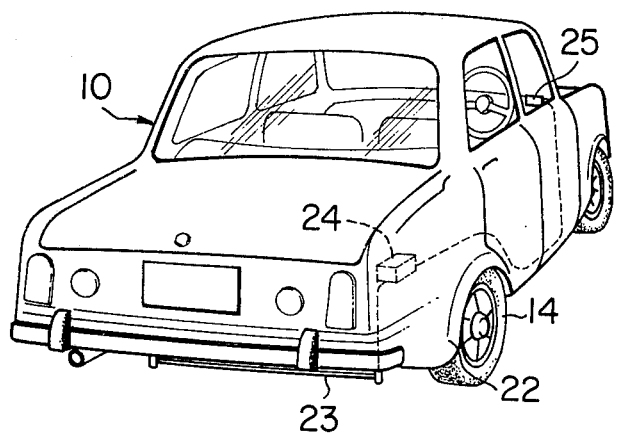
FIG. 1 is a perspective view of a passenger car incorporating the low tire pressure alarm system in accordance with the present invention.
Figure 2:
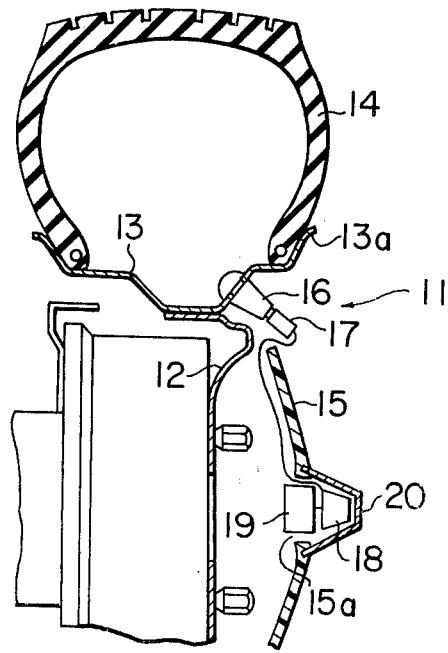
FIG. 2 is a partially sectioned diagrammatic view showing a low tire pressure detector and a radio transmitter mounted on a vehicle wheel in accordance with the present invention.

Referring now to FIGS. 1 and 2, there is shown by way of example a passenger car 10 supported on wheels 11 each one of which includes in the usual manner a wheel disc 12, a rim 13 securely mounted on the wheel disc 12, a tire 14 having its bead portion tightly sealed between the ledge and the flange of the rim 13, and a wheel cap casing 15 covering the outer side of the wheel 11. The rim 13 is provided with an air valve 16 which has connected thereto a tire pressure detector 17 which may be an on-off switch pneumatically communicating with the interior of the tire 14 and operating in response to the pressure level prevailing in the tire 14.

In accordance with the invention, the wheel cap casing 15 is formed from a non-conductive material such as a synthetic resin and has mounted through a center aperture 15a a low tire pressure signal transmitter 18 which is electrically connected to the detector 17 and includes a power source in the form of a battery 19 and an electric circuit designed to produce a radio signal of a particular frequency range upon detection of a low tire pressure by the detector 17. The output terminal of the transmitter 18 is connected to a casing 20 of a truncated cone shape which serves also as a transmitting antenna. The casing 20 is securely mounted substantially at the center of the wheel cap casing 15 in such a manner as to cover the center aperture 15a and the transmitter 18. In this instance, the afore-mentioned transmitter 18 may be of a known design but preferred to be of a relatively light and compact construction. In order to ensure radiation of radio wave signals of sufficient magnitude from the transmitting antenna 20, for example, 12 µv/m or greater at a distance of 100 meters from a receiving antenna, the power source 19 of the transmitter 18 should be of a relatively large capacity.

In this connection, it is to be noted that the transmitting antenna 20 is located outwardly of the rim flange 13a to avoid interference of the signal transmission by the rim flange 13a but inwardly of a fender 22 to protect the antenna 20 from obstacles which might be on the road. The low tire pressure signals transmitted from the antenna 20 are received by a receiving antenna 23 which is mounted on the underside of the vehicle body, for example, beneath the rear luggage compartment so that it is shielded by the vehicle body panels from spurous or extraneous radio signals which may be received from outside or from similar radio signals transimtted from other vehicles. The receiver set 24 is connected to a suitable alarm device 25 which is mounted, for example, on a dashboard of the vehicle in a position which can easily draw the driver's attention when actuated. The alarm device 25 may be a flashing lamp or a buzzer or any other alarm systems which are adapted to give alarm signals upon receipt of an alarm signal from the transmitter 18. In the embodiment shown in FIGS. 1 and 2, the receiver 24 and the alarm device 25 are designed to have power supply from the battery of the vehicle 10.

Figure 3:
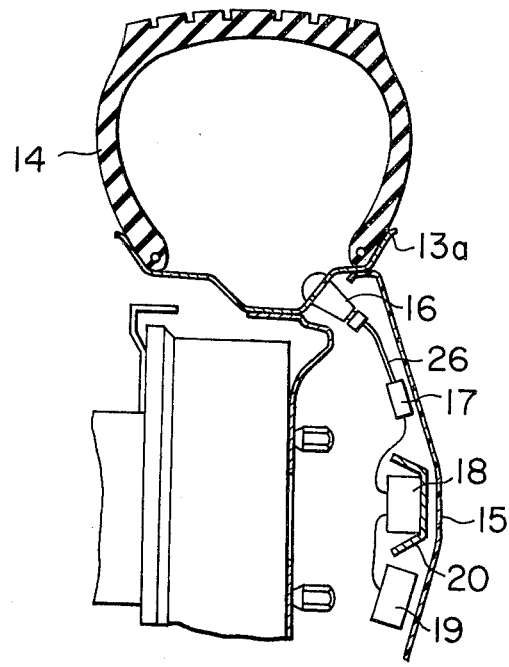
FIG. 3 is a view similar to FIG. 2 but showing a modified arrangement.

Though the detector 17 is mounted on the air valve stem 16 in FIG. 2, it may be located on the inner side of the wheel cap casing 15 of a non-conducting material, if desired, as shown particularly in FIG. 3. The low tire pressure detector 17 may be connected to the air valve 16 by means of a conduit 26. In this instance, the weight of the detector 17 is not born by the air valve 16 but by the wheel cap casing 15, so that it becomes possible to employ a detector of a larger size and naturally of a higher performance quality. It is to be noted that, in the modification shown in FIG. 3, the transmitting antenna 20 is located inwardly of the wheel cap casing 15 which is, as mentioned hereinbefore, of a non-conducting material such as a synthetic resin.

Figure 4:
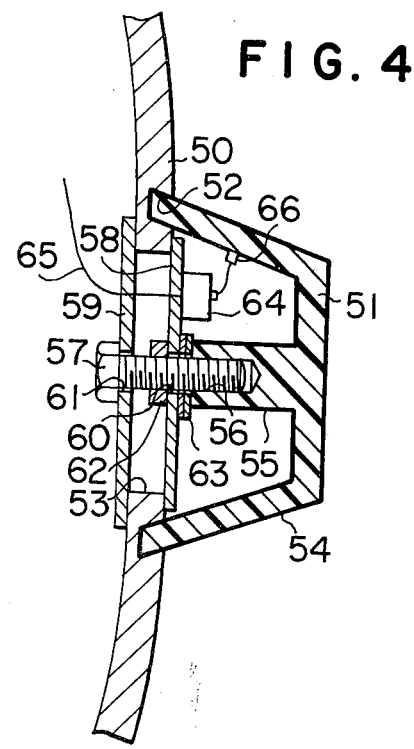
FIG. 4 is a diagrammatic sectional view showing another embodiment of the present invention.

Referring now to FIG. 4, the low tire signal transmitter of the invention is mounted on a wheel cap casing 50 which may be either a conducting or non-conducting material. It is to be noted that, also in this embodiment, the transmitter is housed in a casing 51 of a truncated cone shape and of a synthetic resin material which has its diverging inner end fitted into a circular groove 52 around a center aperture 53 of the wheel cap casing 50 in a manner similar to FIG. 2. The casing 51 is provided with a metal coating 54 on the outer and inner wall surfaces thereof and with a center column 55 with a threaded bore 56 for receiving a bolt 57 which clamps the turncated cone 51, an insulating plate 58 and a back plate 59 together on the wheel cap casing 50. For this purpose, the insulating plate 58 and the back plate 59 are formed with bolt holes 60 and 61 in alignment with the bore 56 of the casing 51. In case the wheel cap casing 50 is of a metallic material, the diverging inner end of the casing 51 is fitted into the annular groove 52 with use of a suitable insulating material (not shown). The insulating plate 58 and the back plate 59 have a diameter larger than the center aperture 53 of the wheel cap casing 50 and are abutted tightly against the opposite sides of the wheel cap casing 50 by means of the bolt 57, a nut 62 and a washer 63. A radio transmitter 64 is securely mounted on the insulating plate 58 and connected to a low tire pressure detector on the tire valve by means of line 65. The output terminal of the radio transmitter 64 is connected as at 66 to the metal coating 54 of the casing 51. In this connection, it is to be understood that a low tire pressure detector may be mounted in a position remote from the tire valve, communicating pneumatically with the interior of the tire by means of a conduit which is connected to the tire valve or a port formed in the rim of the wheel, if desired.

The metal coating 54 is not necessarily required to be provided on both the outer and inner wall surfaces of the casing 51 and may be formed only on the outer or inner wall surface thereof. In addition, the hollow casing 51 may have a shape other than the truncated cone, for example, may be in the form of a trigonal pyramid, dome or semi-sphere, as long as it has hollow space for receiving the low tire pressure detector and/or the radio signal transmitter. Furthermore, the metal coating 54 may cover only a predetermined portion of the outer and/or inner surface area of the casing 51 but is preferred to be provided on the entire surface area of the casing to effect the radiation of the signal waves in higher efficiency in all directions.

Figure 5:
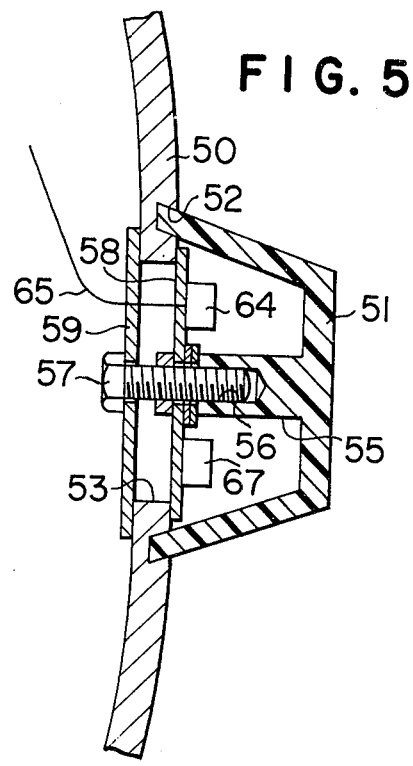
FIG. 5 is a view similar to FIG. 4 but showing still another embodiment of the present invention.

FIG. 5 shows a modification wherein a pwoer source in the form of a battery 67 is fixedly mounted on the insulating plate 58 and operatively connected to a low pressure detector as at 17 of FIG. 1 and to a high frequency oscillator 64 which is adapted to transmit radio signals through a wire coil antenna (not shown) upon energization by the detector. It will be understood that, since power source 67 and the transmitter 64 are housed in a casing of a non-conductive material on the outer side of the wheel cap casing 50, the radio signals are transferred to the receiving antenna without any interference or obstruction as would be experienced with transmitters which are mounted inwardly of a metal wheel cap casing.

Figure 6:
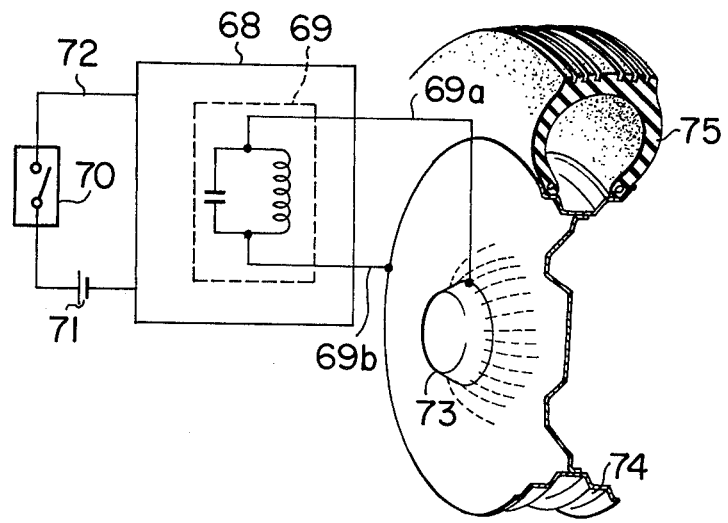
FIG. 6 is a fundermental electric circuit of a radio transmitter provided on a vehicle wheel in accordance with the present invention.
Figure 7:
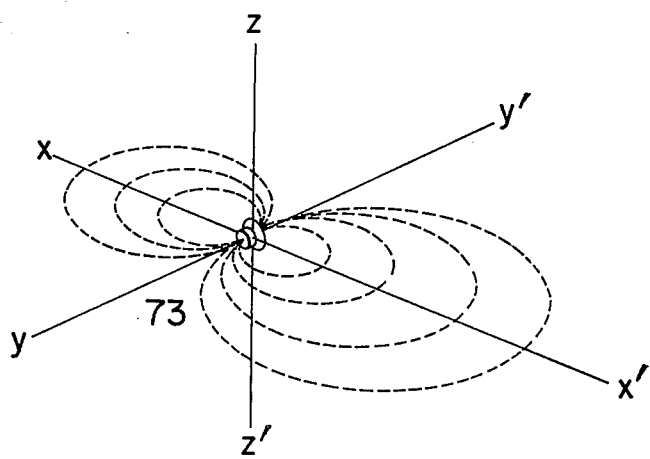
FIG. 7 is a view showing an electricmagnetic wave propagated from a transmitting antenna provided on a wheel cap casing in accordance with the present invention.

FIG. 6 shows a fundermental electric circuit having a high frequency oscillator 68 provided with a resonance circuit 69 therein and connected in series to a sensing switch 70 and a power supply source 71 by an electric conductor 72. The resonance circuit 69 has one end 69a connected to an transmitting antenna 73 and the other end 69b connected to a grounded rim 74. When the internal pressure of the tire 75 is lowered to less than a predetermined value and the sensing switch 70 is closed, the voltage of the power supply source 71 is applied to the oscillator 68 and a resonance voltage is generated between the terminals 69a and 69b of the resonance circuit 69 to energize the transmitting antenna 73. FIG. 7 shows the electricmagnetic wave which is satisfactorily propagated from the transmitting antenna 73 to the receiving antenna 23 attached beneath the vehicle body shown in FIG. 1 since the transmitting antenna 73 is placed on the line y—y' coaxial with the axle of the vehicle wheel.

Although detailed descriptions have been made exclusively on the foregoing embodiment of this invention, is should be understood, as indicated hereinbefore, that the preferred embodiment as described and shown herein do not mean in any way limitations of this invention, but on the contrary, variations and modifications with respect to the construction and operation may further be derived by those skilled in the art to which the present invention pertains, whereby the advantageous characteristics of this invention may be realized without departing from the spirit and scope of the invention as set forth hereunto in the appended claims.

What is claimed is:

1. A low tire pressure alarm system for a pneumatic tire on a vehicle wheel including a wheel disc, a rim securely mounted on said wheel disc and having flanges for holding said tire, and a wheel cap casing covering an outer side of said wheel, said alarm system comprising in combination:
   a low tire pressure detector in pneumatic communication with the interior of said tire for detection of a tire pressure drop below a predetermined level;
   a hollow casing of a non-conductive material securely mounted on and substantially at the center of said wheel cap casing of said vehicle wheel;
   a radio transmitter accommodated in said hollow casing and including a transmitting antenna in insulated relation with said wheel disc of said vehicle wheel and an oscillator having a resonance circuit electrically connected to said transmitting antenna and said wheel disc for producing an alarm signal of a predetermined frequency between said transmitting antenna and said wheel disc upon detection of an abnormal tire pressure drop by said detector; and
   a receiving set including a receiving antenna mounted on the underside of a vehicle body for reception of an alarm signal transmitted from said radio transmitter and a radio receiver unit connected to said receiving antenna for actuating alarm means in response to said alarm signal.

2. A low tire pressure alarm system as defined in claim 1, wherein said radio transmitter has a transmitting antenna located outwardly of said flange of said rim.

3. A low tire pressure alarm system as defined in claim 1, wherein said low tire pressure detector is connected to a valve stem of said tire.

4. A low tire pressure alarm system as defined in claim 3, further comprising a power source in the form of a battery accommodated in said hollow casing and connected to said low tire pressure detector and said radio transmitter for energizing said transmitter upon detection of an abnormal pressure by said detector.

5. A low tire pressure alarm system as defined in claim 1, wherein said wheel cap casing is formed from a non-conductive and said hollow casing is adapted to serve as a transmitting antenna for said radio transmitter.

6. A low tire pressure alarm system as defined in claim 5, wherein said hollow casing serving as a transmitting antenna is mounted on the other side of said wheel cap casing.

7. A low tire pressure alarm system as defined in claim 5, wherein said hollow casing serving as a transmitting antenna is mounted on the inner side of said wheel cap casing.

8. A low tire pressure alarm system as defined in claim 1, wherein said radio receiver unit is mounted within a luggage compartment of the vehicle.

9. A low tire pressure alarm system as defined in claim 1, wherein said low tire pressure detector is mounted on said wheel cap casing of said vehicle wheel and connected to a valve stem of said tire by way of a tubing.

10. A low tire pressure alarm system as defined in claim 1, wherein said hollow casing is formed from a non-conducting material and provided with a metal coating serving as a transitting antenna for said radio transmitter.

11. A low tire pressure alarm system for a pneumatic tire on a vehicle wheel including a wheel disc, a rim securely mounted on said wheel disc and having flanges for holding said tire, and a wheel cap casing convering an outer side of said wheel, said alarm system comprising in combination:
   a low tire pressure detector in pneumatic communication with the interior of said tire for detection of a tire pressure drop below a predetermined level;
   a hollow casing of non-conductive material securely mounted on and substantially at the center of said wheel cap casing of said vehicle wheel;

a radio transmitter accommodated in said hollow casing and connected to said low tire pressure detector for producing an alarm signal of predetermined frequency upon detection of an abnormal tire pressure drop by said detector; and a receiving set including a receiving antenna for reception of an alarm signal transmitted from said radio transmitter and a radio receiver unit connected to said receiving antenna for actuating alarm means in response to said alarm signal; said hollow casing being formed from a non-conducting material and provided with a metal coating serving as a transmitting antenna for said radio transmitter; said hollow casing having a truncated cone shape and having its diverging end securely fitted into an annular groove formed in the center portion of said wheel cap casing concentrically with respect to a center aperture thereof and said radio transmitter is mounted on an insulating plate covering said center aperture on the outer side of said wheel cap casing and clamped tightly to said hollow casing together with a backing plate covering said center aperture on the inner side of said wheel cap casing.

12. A low tire pressure alarm system as defined in claim 10, wherein said metal coating is provided on both the outer and inner wall surfaces of said hollow casing.

13. A low tire pressure alarm system as defined in claim 10, wherein said metal coating is provided on the outer wall surface of said hollow casing.

14. A low tire pressure alarm system as defined in claim 10, wherein said metal is provided on the inner wall surface of said hollow casing.

15. A low tire pressure alarm system as defined in claim 1, wherein said radio transmitter is provided with a wire coil antenna for transmission of said alarm signal.

* * * * *